UNITED STATES PATENT OFFICE.

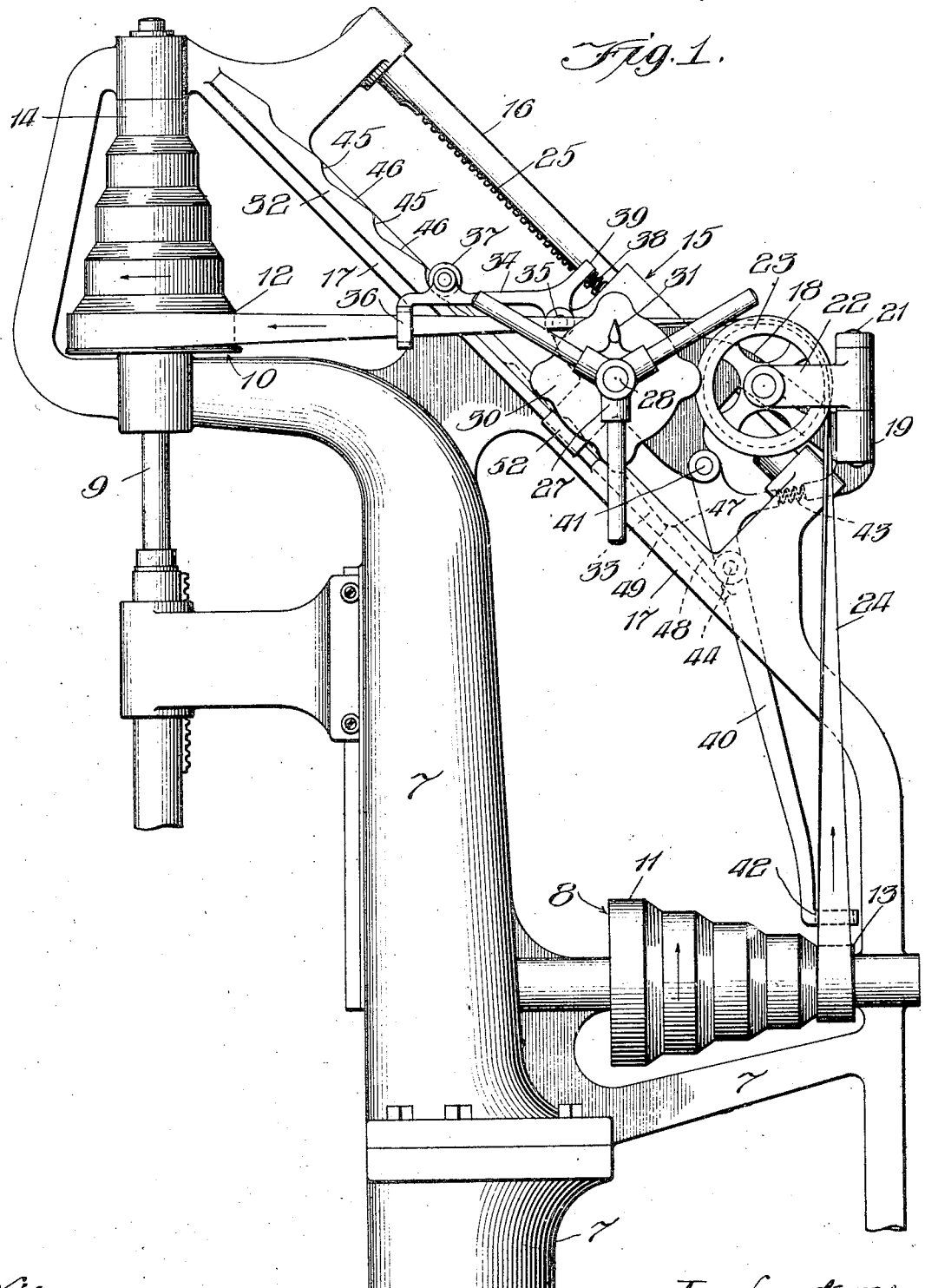

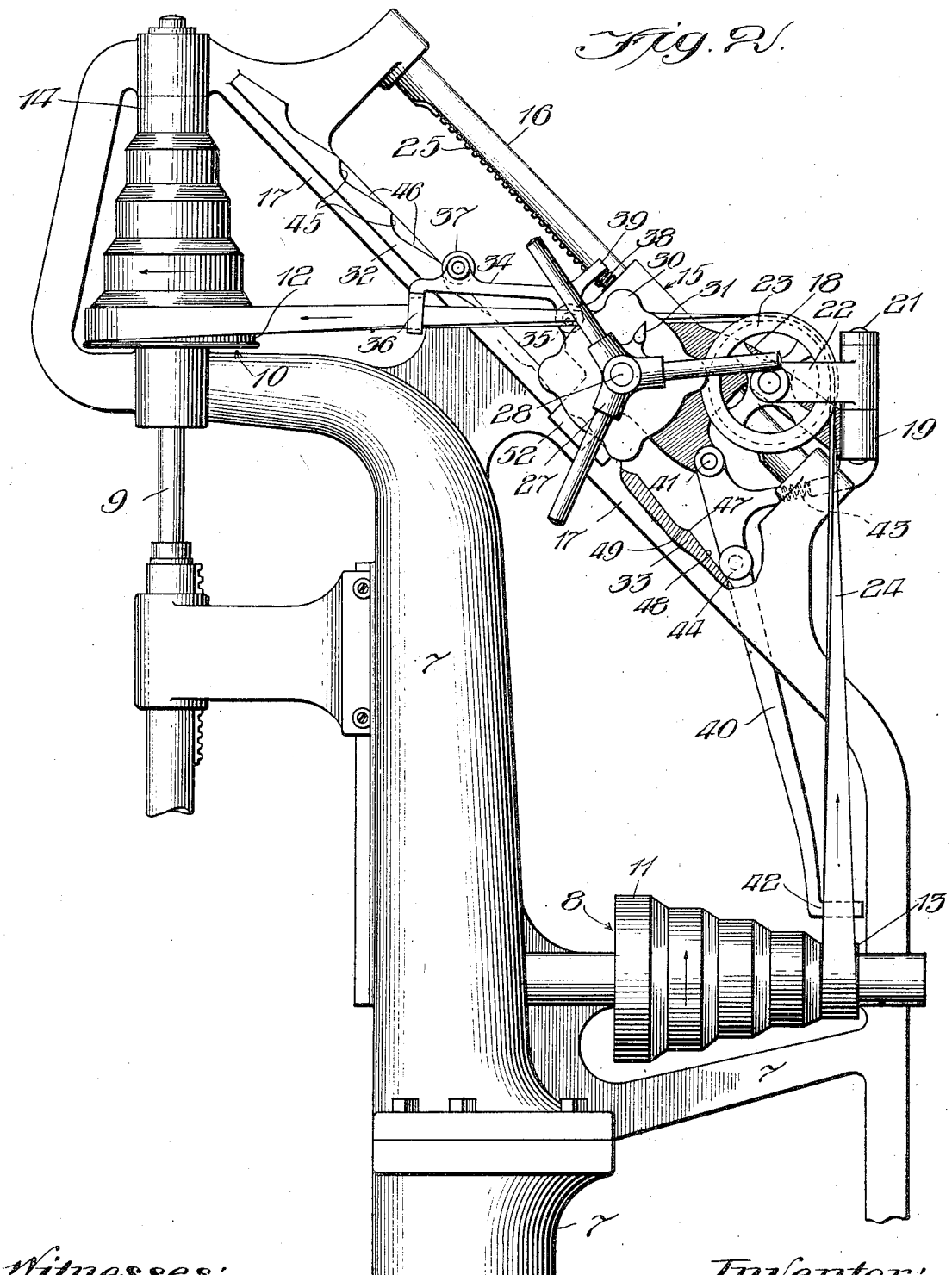

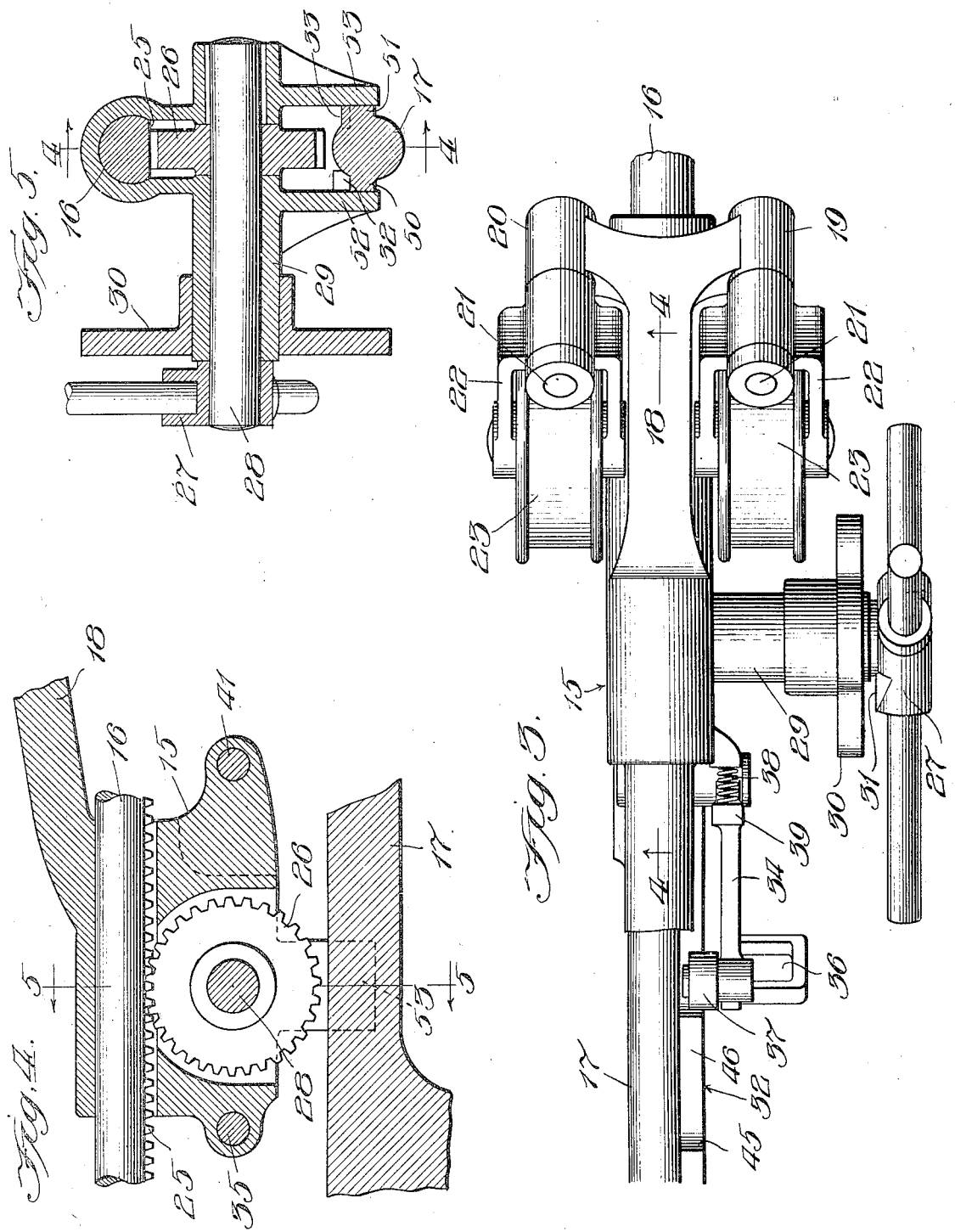

ROBERT MILNE, OF ROCKFORD, ILLINOIS.

BELT-SHIFTER.

Specification of Letters Patent. Patented Aug. 20, 1912.

Application filed June 26, 1911. Serial No. 635,316.

*To all whom it may concern:*

Be it known that I, ROBERT MILNE, a citizen of the United States, residing at Rockford, in the county of Winnebago and State of Illinois, have invented certain new and useful Improvements in Belt-Shifters, of which the following is a specification.

The present invention relates particularly to a belt shifter intended for use in connection with drill presses, in which the speed of the drill spindle is changed by shifting a belt from one surface to another across a pair of cone pulleys. It will be evident from a study of the mechanism, however, that it is in no wise limited to use in connection with drill presses. Where such a system of speed change is used, the pulleys are relatively so placed that as the belt moves from a surface of large diameter on one cone to a surface of small diameter on the same cone, it moves from a surface of small diameter on the other cone to a surface of larger diameter on that cone. By properly proportioning the successive diameters of the surfaces on the two cones, the belt remains taut in each driving position, so that the ratio between the speeds of the cones depends upon the relative diameters of the two driving surfaces over which the belt is passing at any instant.

One of the cone pulleys serves as a source of power to drive the other cone pulley through the medium of the belt. The driving pulley usually rotates at uniform speed, so that the speed of the following pulley depends upon the surfaces over which the belt is passing at any instant. To increase the speed of the following pulley, the belt should be shifted to a surface of smaller diameter on said pulley and to a surface of larger diameter on the driving pulley. In order to properly effect this speed change, the belt should first be transferred from the larger to the smaller surface of the follower, and afterward from the smaller to the larger surface of the driver. By transferring the belt in this manner, there will be no danger of excessively straining it, because there will be assurance that the belt will never occupy positions on two large surfaces at the same time. Furthermore, the belt will be found to shift more easily from the smaller to the larger surface of the one pulley when a proper amount of slack has been provided in the belt.

Most drill presses are constructed with their drill spindles extending in a vertical direction, while the power shaft extends in a horizontal direction. Owing to this fact, the driving connection from the power shaft to the drill spindle must make a right-angle turn at some point. It has heretofore been impracticable, as far as I am aware, to make a right-angle turn from one cone pulley to another, and therefore it has been customary to place both of the cone pulleys with their axes parallel, so that the belt may pass directly over both of them, and then to provide a bevel gear or other similar connection from the following cone pulley to the drill spindle. This arrangement presents disadvantages, in that a gearing connection must be provided in addition to the belt connection between the cone pulleys, thus increasing the cost of manufacture and lowering the efficiency of operation.

One of the principal objects of the present invention is to provide mechanism whereby the belt may be passed over two cone pulleys which are not parallel to each other, and at the same time to provide means permitting the shifting of the belt from surface to surface on each pulley in the proper manner.

Other objects are: to provide a mechanism of such construction that the belt will ride properly and without unnecessary friction or binding on both of the pulleys after it has been thrown into any running position; to provide means for shifting the belt from surface to surface in such a way that the belt will always pass from the larger to the smaller surface of one pulley before it passes from the smaller to the larger surface of the other pulley, thus insuring that the aforementioned slack will be provided in the belt at the proper time; to provide mechanism of such construction that as the belt is shifted from surface to surface it will operate properly, no matter what may be the angle between the axes of the pulleys; to provide mechanism of such construction that the operator can tell by glancing at a dial just what is the ratio between the speeds of the two cone pulleys, or just what is the actual speed of the following pulley; and in other ways and manners to provide a mechanism intended to meet all of the foregoing as well as other requirements.

Other objects and uses will appear from a detailed description of the invention, which consists in the features of construction and combination of parts hereinafter described and claimed.

Referring now to the drawings, Figure 1 shows a side elevation of the mechanism looking toward the handle side thereof, the belt riding over the small surface of the driving cone and over the larger surface of the following cone, and the operating handle standing in a normal position; Fig. 2 shows a view similar to Fig. 1, the operating handle being thrown over a slight amount, however, so that the carriage has started to travel upward, and so that a pressure is being exerted on the belt at the proper point to throw the same off from the larger surface of the following cone, no pressure as yet being exerted on the belt to tend to make the same ride up onto a larger surface of the driving cone; Fig. 3 shows a plan view looking down on the carriage, guide pulleys and associated parts; Fig. 4 shows a detail section taken on line 4—4 of Fig. 5, looking in the direction of the arrow; and Fig. 5 shows a detail section taken on line 5—5 of Fig. 4, looking in the direction of the arrows.

In the embodiment of my invention, I so place the cone pulleys on their respective shafts that their larger cone surfaces are adjacent to each other, or so that their smaller cone surfaces are adjacent to each other, as the case may be. In the particular construction illustrated, both of the larger cone surfaces occupy adjacent positions toward the inner side of the angle between the driving and following shafts. I then provide a movable carriage which carries guide pulleys, and I mount the same on a suitable rail or the like at a point within the angle between the pulley shafts, the belt passing from a surface of one cone pulley over a guide pulley, over a surface of the other pulley, and over the other guide pulley and back to the starting point. The carriage is so mounted that it may be shifted back and forth on its rail, carrying with it the guide pulleys, and so that at its several positions the belt will pass properly from a surface of the driving cone pulley to the proper or complementary surface of the following cone pulley. I then provide means, preferably on the carriage itself, for exerting a pressure on the belt adjacent to each cone pulley, so as to insure a proper shifting of the belt from surface to surface.

Referring to the drawings, the frame of the drill press to which my belt shifter is applied is designated by the numeral 7. Near its lower portion it carries a power shaft, on which is mounted a driving cone pulley 8, and near its upper portion it is provided with a drill spindle shaft 9, on which is mounted another cone pulley 10. It will be noticed that in the particular arrangement adopted, the largest surface 11 of the cone pulley 8, and the largest surface 12 of the cone pulley 10, are adjacent to each other, while the smallest surface 13 of the cone pulley 8, and the smallest surface 14 of the cone pulley 10, are farthest from each other. Each cone pulley is provided with any number of intermediate steps desired.

A carriage 15 is mounted on a rail 16, which extends in a slanting direction across the upper portion of the machine, it being further supported by means of a bar 17 which extends parallel to the rail 16. In the particular construction illustrated, the carriage is provided with an arm 18, the lower portion of which is T-shaped, and provides two bearings 19 and 20, in which pins 21 are mounted. Each pin carries a yoke 22, within which is carried a guide pulley 23, which is preferably flanged to insure a proper running of the belt.

It is obvious that if the carriage is shifted up from the position illustrated in Fig. 1, there will be a tendency for the belt to ride down onto one of the smaller surfaces of the cone pulley 10 and to ride up onto one of the larger surfaces of the cone pulley 8. It is apparent that by properly locating the rail 16 the carriage will be guided in such direction that, when the belt is riding properly on any surface of the driving cone pulley, it will also be riding properly on the complementary surface of the following cone pulley.

Means are provided for shifting the carriage back and forth. In the particular construction illustrated, these means comprise a rack 25 on the lower face of the rail 16, and a pinion 26 mounted in the carriage and meshing with this rack. A handle 27 serves as a means for rotating the pinion in the carriage so as to cause the latter to travel back and forth on the rack, thus shifting the carriage back and forth on the rail 16. The shaft 28, which connects the handle 27 to the pinion 26, extends out through a sleeve 29 of the carriage, on which sleeve is mounted a dial 30 or the like, having marked on its face characters indicating the speeds of the following cone pulley, or ratios between speeds of the two pulleys, as desired. A finger 31, mounted on the handle 27, serves to indicate on the dial the position of the carriage.

So much for the mechanism which causes the guide pulleys 23 to move back and forth.

It is obvious that the mechanism thus far described would not operate to the best advantage, because there would not be exerted a proper force for throwing the belt from one cone surface to another. In order to overcome this difficulty, I have provided means for exerting a pressure on the belt at a point slightly in advance of each cone pulley when the carriage starts to travel in the one direction or the other. Referring again to Figs. 1 and 2 in particular, on the near side of the rail 17 there is provided a cam surface 32, while on the far side of said rail there is provided a cam surface 33. An arm 34 is pivoted to the carriage at the point 35, it being provided in its end portion with a loop 36, which surrounds the belt at a point in advance of the follower 10, a roller 37 on said arm being adapted to engage the cam surface 32, and a spring 38, which presses against a finger 39, serving to maintain the roller 37 in engagement with the cam surface at all times. In like manner an arm 40 is pivoted to the carriage at the point 41, its lower end being provided with a loop 42 which surrounds the belt adjacent to the cone pulley 8, a spring 43 serving to maintain a roller 44 on said arm always in engagement with the cam surface 33. Of course, the springs and arms above described travel with the carriage. It will be seen that the arms will oscillate back and forth, by reason of the engagement of the rollers 37 and 44 with their respective cam surfaces. The cam surface 32 is provided with abrupt faces 45, which look downwardly with respect to the direction of carriage travel, while it is provided with gradual faces 46 which look upwardly with respect to the direction of carriage travel.

Referring now particularly to Figs. 1 and 2, I will explain the manner in which the above described mechanism acts to shift the belt from surface to surface. In Fig. 1 the carriage is shown in a normal running position, while in Fig. 2 the handle 27 has been rotated a slight amount so as to move the carriage upward on the rail 16. Owing to the peculiar shape of the cam surface, the roller 37 of the arm 34 will be raised very quickly, so that by an extremely small movement of the carriage the loop end of the arm 34 will be thrown up, as illustrated in Fig. 2. The belt is presumed to be traveling, and the cone pulleys to be rotating in the directions indicated by the arrows. Under these conditions, as soon as the arm 34 has been thrown up, as illustrated, the belt will start to travel upward on the cone pulley 10, so that it will eventually ride over onto the next smaller surface. It will be understood that the handle 27 should be given a quarter turn in order to allow the arms to occupy new positions corresponding to the first belt shift. It is also understood that in use the operator would grasp the handle and rotate the same with a practically uniform speed during the entire quarter revolution. We shall now consider the movements of the other arm. It will be seen by examination of the relative positions of the parts that during the initial movement of the carriage the roller 44 of the arm 40 engages the cam surface 33 in such a way that the loop 42 remains practically stationary, thus exerting no force on the belt which would tend to throw the same up onto a larger surface on the pulley 8. By properly proportioning the cam surfaces, it is possible to cause the belt to ride completely off from the larger surface of the pulley 10 before any force is exerted on the belt by the loop 42 to throw the belt up onto a larger surface of the pulley 8. When the roller 44 finally rides over the corner 47 of the cam 33 from the gradual face 48 to the abrupt face 49 thereof, the arm 40 will suddenly swing over toward the left and exert a sufficient pressure on the belt to throw the same up onto the larger surface of the pulley 8. It is obvious that in moving the carriage down on the rail 6 from a higher to a lower position, exactly the opposite movements will occur, the belt being thrown off from a larger to a smaller surface on the pulley 8 before it is thrown from a smaller to a larger surface on the pulley 10. By pivoting the guide pulleys 23, in the manner shown, they may adjust their axes so that they will rotate to the best advantage, according to the position of the belt on the cone pulleys. Manifestly, as the carriage is moved up on the rail, so that the belt travels onto the smaller surfaces of the pulley 10, the guide pulleys 23 will swivel inward, so that the belt may pass directly over them to the cone pulley without binding on their flanges.

Referring particularly to Figs. 3 and 5, it will be seen that the rail 17 is provided with a pair of flanges 50 and 51, which are contacted by brackets 52 and 53 of the carriage. These flanges serve to guide the carriage and keep it in a perfectly vertical position. In the particular construction illustrated, these flanges serve also as the cams 32 and 33.

I desire to point out particularly the fact that my mechanism is one which enables the belt to be shifted without the necessity of using any form of a belt tightener after the belt has been shifted. I am enabled to shift the belt without the necessity of first loosening it and then tightening it by some additional mechanism, by reason of the fact that the mechanism of my present invention shifts the belt first from a large to a small surface, and then from the small to the large complementary surface.

I claim:

1. The combination with a pair of cone pulleys, of a traveling member, a pair of swinging arms on the same adapted to shift the belt from surface to surface of each cone pulley, a pair of stationary cam surfaces adjacent to the traveling member, a contacting element on each arm adapted to engage the corresponding cam surface, and means for flexibly retaining the contacting element of each arm in engagement with its cam surface, substantially as described.

2. The combination with a pair of cone pulleys having their axes set at an angle with each other, of a traveling member, a pair of swinging arms on the same adapted to shift the belt from surface to surface of each cone pulley, a pair of stationary cam surfaces adjacent to the traveling member, a contacting element on each arm adapted to engage the corresponding cam surface, and means for flexibly retaining the contacting element of each arm in engagement with its cam surface, substantially as described.

3. The combination with a pair of cone pulleys having their axes set at an angle with each other, of a traveling belt guide member, a pair of swinging arms on the same adapted to shift the belt from surface to surface of each cone pulley, a pair of stationary cam surface adjacent to the traveling belt guide member, a contacting element on each arm adapted to engage the corresponding cam surface, and means for flexibly retaining the contacting element of each arm in engagement with its cam surface, substantially as described.

4. The combination with a pair of cone pulleys, of a traveling member, a pair of swinging arms on the traveling member, a pair of stationary cam surfaces adjacent to the traveling member, a contacting element on each of the swinging arms adapted to engage the corresponding cam surface, and means for retaining the contacting member of each arm in engagement with its surface, the cam surfaces being suitably formed to shift the belt from a larger to a smaller surface of one cone pulley and then from a smaller to a larger surface of the other cone pulley, substantially as described.

5. The combination with a pair of cone pulleys having their axes set at an angle with each other, of a traveling belt guide member for directing a belt from one surface of one cone pulley to a complementary surface of the other cone pulley, a pair of swinging arms on the traveling member, a pair of stationary cam surfaces adjacent to the traveling member, a contacting element on each of the swing arms adapted to engage the corresponding cam surface, and means for retaining the contacting member of each arm in engagement with its surface, the cam surfaces being suitably formed to shift the belt from a larger to a smaller surface of one cone pulley and then from a smaller to a larger surface of the other cone pulley, substantially as described.

6. In a belt shifter, the combination of a track-way, a carriage mounted on the same, a pair of arms pivoted to the carriage, a belt-contacting element on each arm, and means for actuating the arms alternately as the carriage is shifted to cause the contacting surfaces to engage the belt in succession, substantially as and for the purpose set forth.

7. In a belt shifter, the combination of a track-way, a carriage movably mounted on the same, a pair of arms swingingly mounted on the carriage, a belt-contacting element on each arm, and stationary members which are engaged by the arms to actuate them in succession to cause the contacting surfaces to engage the belt in succession, substantially as described.

8. In a belt shifter, the combination of a track-way, a carriage movably mounted on the same, a pair of cam members fixed with respect to the track-way, a pair of arms swingingly mounted on the carriage, a belt-contacting element on each arm, and members carried by the arms and engaging the cam members, the cam members being of such formation that as the carriage is shifted in either direction the leading arm is first advanced forwardly and the following arm is swung backwardly with respect to the carriage, and so that the leading arm is subsequently swung in toward the carriage and the following arm is subsequently advanced forwardly, substantially as described.

9. In a belt shifter, the combination of a member, a carriage slidably mounted on the same, a pair of cam members stationary with respect to the first mentioned member, a pair of arms swingingly mounted on the carriage a belt contacting element on each arm, and members on the arms engaging the corresponding cam members, the cam members being of a formation such that as the carriage is moved in either direction the leading arm first swings forwardly in the direction of carriage movement, while the following arm lags behind, and so that the leading arm subsequently swings in toward the carriage, while the following arm advances with respect to the carriage, substantially as described.

10. In a belt shifter, the combination of a member, a carriage slidably mounted on the same, a pair of cam members stationary with respect to the first mentioned member, a pair of arms swingingly mounted on the carriage, a belt-contacting element on each arm, a member on each arm engaging the corresponding cam member, and means for retaining the arm members constantly in engagement with the corresponding cam members, substantially as described.

ROBT. MILNE.

Witnesses:
   SAMUEL H. RECK,
   H. LEECH.